United States Patent [19]

Arnold et al.

[11] 3,739,286

[45] June 12, 1973

[54] CRYSTAL FILTER WITH TEMPERATURE COMPENSATION

[76] Inventors: James G. Arnold, 1624 South Augusta Place; Lloyd D. Myers, 8401 East Hayne Place, both of Tucson, Ariz. 85710

[22] Filed: July 6, 1971

[21] Appl. No.: 159,975

[52] U.S. Cl. .................... 325/416, 325/489, 333/72

[51] Int. Cl. .......................... H03h 3/04, H04b 1/16

[58] Field of Search .......................... 325/416, 489; 333/72

[56] References Cited

UNITED STATES PATENTS 2,070,732 2/1937 Holden .............................. 325/489

2,266,658 12/1941 Robinson .............................. 333/72

*Primary Examiner*—Howard W. Britton

*Attorney*—Harris, Kern, Wallen & Tinsley

[57] ABSTRACT

A narrow band transmission system using a crystal filter having a pass band width in the order of one hertz and operable over an ambient temperature range of 60° C. The output of a crystal controlled oscillator is mixed with the incoming signal to provide a sum signal as the input to the filter. The oscillator and filter crystals have matched temperature characteristics so that the oscillator frequency and the filter center frequency vary in the same amount with change in temperature.

5 Claims, 2 Drawing Figures

Figure 1:
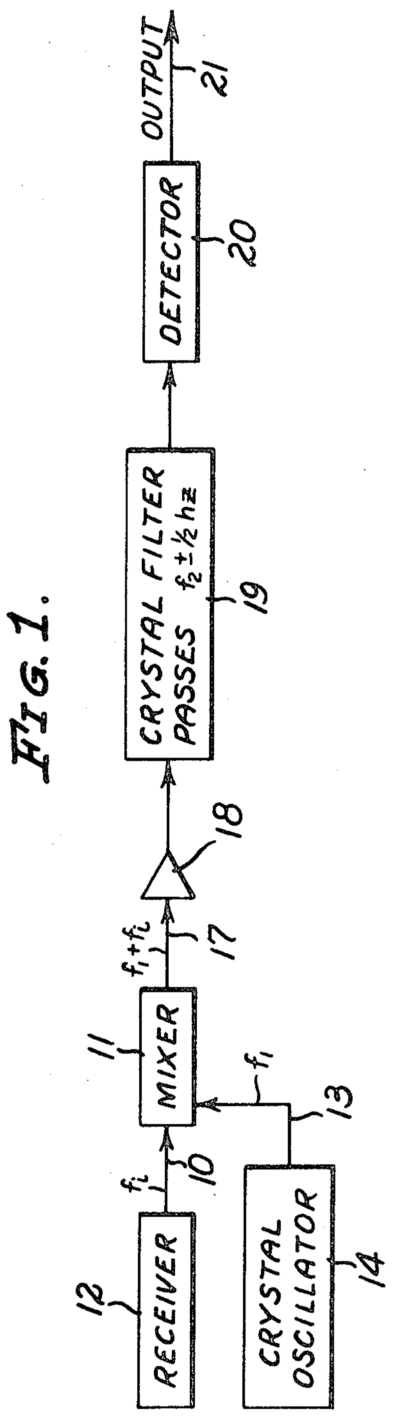

INVENTORS.
JAMES G. ARNOLD
LOYD D. MYERS
BY THEIR ATTORNEYS.
HARRIS, KIECH, RUSSELL & KERN

CRYSTAL FILTER WITH TEMPERATURE COMPENSATION

This invention relates to narrow band transmission systems and in particular, to a new and improved narrow band system utilizing a crystal filter with a pass band in the order of one hertz, with the system being operable over a wide range of ambient temperature while maintaining the desired center frequency for the pass band.

Data transmission systems are often utilized where it is desirable to accommodate very low data rates or where, because of the low frequency response of the transmitted data, it is desirable to maintain very narrow filter bandwidth. In such systems, the extremely narrow bandwidth provides maximum noise discrimination and/or data frequency selectivity. A bandwidth in the order of a few hertz or lower is readily obtained with a conventional crystal filter. However, drift due to temperature change produces shifts in the center frequency which may readily exceed the bandwidth and which results in rejection of the transmitted data frequency.

A conventional crystal filter operating at approximately 20 khz can have a bandwidth of approximately 1 hz. However, with a temperature variation of 60° C., the resonant frequency of such a crystal varies by about 100 ppm or by about 2.25 hz. Such a drift in center frequency for the pass band is not compatible with a 1 hz bandwidth. In one solution for this problem, the temperature of the crystal is maintained substantially constant by installing the circuitry in an oven with suitable temperature stabilization. However, the solution is not always a satisfactory one because of the space required and/or the power consumption.

It is an object of the present invention to provide a new and improved temperature compensation for a narrow band transmission system utilizing a crystal filter. A further object is to provide such a system particularly suited for use with a pass band in the order of one hertz and which does not require a temperature control for the filter crystal. Other objects, advantages, features and results will more fully appear in the course of the following description.

Figure 2:
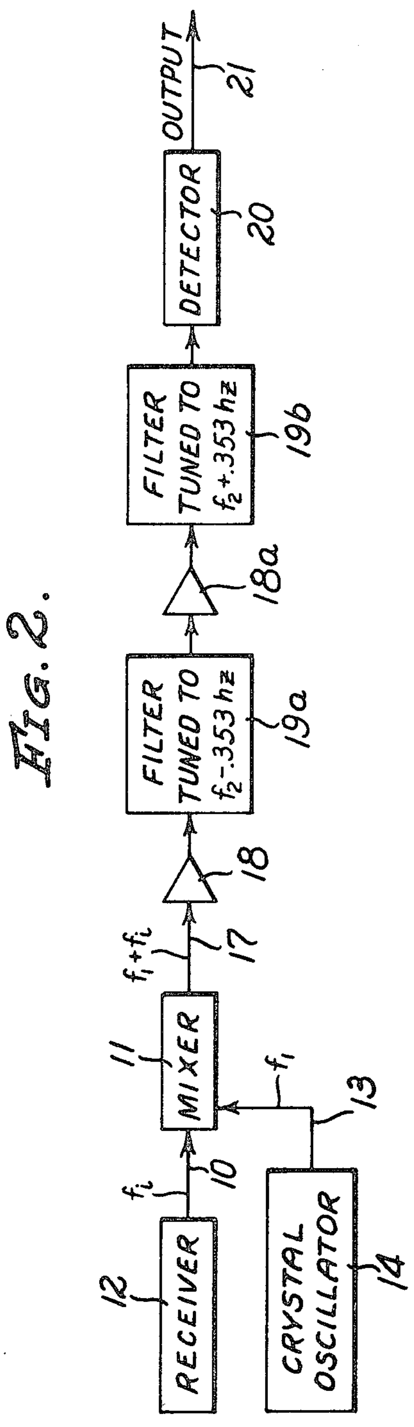

In the drawing,

FIG. 1 illustrates a narrow band transmission system incorporating a preferred embodiment of the present invention; and FIG. 2 illustrates a narrow band transmission system having two filters in cascade and incorporating the present invention.

The input signal of interest $f_i$ is connected via line 10 as one input to a mixer 11. Typically the input signal $f_i$ may be the intermediate frequency from a radio receiver 12.

A second input $f_1$ for the mixer 11 is provided via line 13 from a crystal controlled oscillator 14. The mixer operates in the conventional manner to provide an output on line 17 of a frequency which is the sum of the two input frequencies.

The mixer output is amplified in an amplifier 18 and connected as an input to a crystal filter 19, with the filter output connected to a detector 20, to provide the information at output line 21.

The filter 19 is a conventional crystal filter which has a narrow pass band, with a bandwidth of 1 hertz in the example illustrated. The center frequency of the pass band of the filter is $f_2$ and, in the embodiment illustrated, an incoming signal $f_i$ having a frequency equal to $f_2 - f_1 \pm ½$ hz will be passed through the filter to the detector and all other incoming signals will be rejected.

Compensation for change in ambient temperature is accomplished by utilizing matched crystals in the oscillator 14 and the filter 19. The two crystals will be operating at resonant frequencies of the same order of magnitude and by matching the drift characteristics, the change in frequency $f_1$ and in frequency $f_2$ with change in temperature over a range of 60° C will be substantially the same, so that the frequency selectivity characteristic of the system is maintained. Preferably both crystals are similar cuts from identical material. Desirably the frequencies $f_1$ and $f_2$ are selected so that the resonant frequencies of the crystals differ by not more than 20 percent and preferably by not more than 10 percent.

In a typical example, frequency $f_2$ may be 22.5 khz and frequency $f_1$ may be 20 khz. The system is then selective for an input frequency $f_i$ of 2.5 khz $\pm ½$ hz. The range of the frequencies $f_1$, $f_2$ is determined mainly by the band width desired and by the Q of the available crystals. For a bandwidth of 1 hz with a single crystal, frequencies of 10 hz to 40 hz are useful.

In the circuit of FIG. 2, components corresponding to those of FIG. 1 are identified by the same reference numerals. Two single crystal filter sections **19*a* and 19*b* are connected in cascade with an intermediate amplifier 18*a*** to provide a higher order filter with the 1 hertz bandwidth and a skirt rejection of 12db/octave, rather than the 6db/octave of the single crystal filter.

The filters **19*a* and 19*b* are tuned to center frequencies 0.353hz above and below the desired center frequency $f_2$, with each having a bandwidth of 0.707hz. The crystals of the oscillator 14 and filters 19*a* and 19*b* are selected to be matched, as in the circuit of FIG. 1**. Three or more filter sections may be cascaded in the same manner to provide higher order temperature compensated filters.

The narrow band system of the invention may be used wherever a narrow pass band is desired in an electrical signal handling system. By way of example, the narrow band system may be used at a radio receiver to extract or pass a narrow band signal which has been superimposed on a voice channel of a radio transmitter.

Thus it is seen that the frequency selectivity of a very narrow band system can be precisely maintained over a wide variation in ambient temperature without requiring actual temperature control and its attendant size and power requirements. Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim:

1. In a narrow band transmission system, the combination of:

an oscillator for producing an oscillator output of a first frequency, and having a first crystal for frequency control;

a mixer;

means for connecting an input signal of a third frequency and said oscillator output to said mixer as inputs for producing a mixer output which is a combination of said first and third frequencies;

a first narrow band filter having a second crystal for defining the pass band of said first filter at a second frequency with a band width in the order of 1 hertz; and means for connecting said mixer output as an input to said first filter;

with said first and second crystals having matched temperature characteristics so that said oscillator first frequency and said filter pass band second frequency vary in the same amount with change in temperature.

2. A system as defined in claim 1 in which said second frequency is equal to the sum of said first and third frequencies.

3. A system as defined in claim 1 in which said third frequency is an intermediate frequency from a radio receiver and in the order of several thousand hertz, and said first and second frequencies are of the same order of magnitude and greater than said third frequency.

4. A system as defined in claim 1 including:

a second narrow band filter having a third crystal for defining the pass band of said second filter at a fourth frequency with a bandwidth in the order of 1 hertz; and means for connecting the output of said first filter as the input to said second filter;

with said first, second and third crystals having matched temperature characteristics so that said first, second and fourth frequencies vary in the same amount with change in temperature.

5. A system as defined in claim 4 in which each of said second and fourth frequencies varies in opposite directions from the sum of said first and third frequencies a small deviation in the order of a hertz or less.

* * * * *